(12) United States Patent
Chang

(10) Patent No.: US 11,027,318 B2
(45) Date of Patent: Jun. 8, 2021

(54) AUTOFEEDER ROLLER CLEANING

(71) Applicant: Herman Chang, Rancho Dominguez, CA (US)

(72) Inventor: Herman Chang, Rancho Dominguez, CA (US)

(*) Notice: Subject to any disclaimer, the term of this patent is extended or adjusted under 35 U.S.C. 154(b) by 0 days.

(21) Appl. No.: 15/933,243

(22) Filed: Mar. 22, 2018

(65) Prior Publication Data
US 2019/0193127 A1 Jun. 27, 2019

Related U.S. Application Data

(60) Provisional application No. 62/459,540, filed on Feb. 15, 2017, provisional application No. 62/608,509, filed on Dec. 20, 2017.

(51) Int. Cl.
*B08B 7/00* (2006.01)
*B08B 1/00* (2006.01)
(Continued)

(52) U.S. Cl.
CPC .............. *B08B 7/0028* (2013.01); *B08B 1/00* (2013.01); *B08B 1/001* (2013.01); *B08B 1/02* (2013.01);
(Continued)

(58) Field of Classification Search
CPC .......... B02C 18/0007; B02C 2018/166; B02C 23/02; B08B 1/00; B08B 1/001; B08B 1/02; B08B 3/04; B08B 7/0028
See application file for complete search history.

(56) References Cited

U.S. PATENT DOCUMENTS 9,239,132 B1 * 1/2016 Wang ...................... F16N 25/00
2005/0095354 A1 * 5/2005 Allen ................... B02C 18/0007
427/11
(Continued)

FOREIGN PATENT DOCUMENTS

CN 103736577 A * 4/2014
CN 103752563 A * 4/2014
JP 2018103561 A * 7/2018

OTHER PUBLICATIONS

JP-2018103561-A—English Machine Translation (Year: 2018).*
(Continued)

*Primary Examiner* — Marc Carlson
(74) *Attorney, Agent, or Firm* — Stefan J. Kirchanski; Matthew J. Spark; Zuber Lawler LLP

(57) ABSTRACT

Inventive cleaning sheets contact the rollers of paper shredder autofeed mechanisms with cleaning material that is either moistened with a solvent or treated with a low tack adhesive—either of which remove dirt and contaminants from the rollers. In one embodiment the moistened cleaning material is attached to a rigid sheet sized to fit into the paper compartment of the shredder where the cleaning material is brought into contact with the feed roller. The shredder is operated which causes dirt to be transferred from the rollers to the cleaning material. Alternatively, the cleaning material can be attached to a flexible but impermeable sheet which is placed into the shredder. The shredder is operated and after the rollers are cleaned, they may grab the entire flexible sheet and shred it, thereby additionally cleaning the shredding mechanism.

7 Claims, 5 Drawing Sheets

(51) Int. Cl.
*B08B 1/02* (2006.01)
*B08B 3/04* (2006.01)
*B02C 23/02* (2006.01)
*B02C 18/00* (2006.01)
*B02C 18/16* (2006.01)

(52) U.S. Cl.
CPC ............ *B08B 3/04* (2013.01); *B02C 18/0007* (2013.01); *B02C 23/02* (2013.01); *B02C 2018/166* (2013.01)

(56) References Cited

U.S. PATENT DOCUMENTS

| | | | |
|---|---|---|---|
| 2007/0080252 A1* | 4/2007 | Pierce | B02C 18/0007 241/236 |
| 2007/0087942 A1* | 4/2007 | Allen | B02C 18/0007 508/100 |
| 2007/0164138 A1* | 7/2007 | Allen | B02C 18/0007 241/101.01 |
| 2009/0126138 A1* | 5/2009 | Forrest, Jr. | B08B 1/00 15/214 |
| 2009/0188529 A1 | 7/2009 | Maynard | |
| 2012/0018553 A1* | 1/2012 | Allen | B02C 18/0007 241/101.01 |
| 2014/0367298 A1* | 12/2014 | Chang | B65D 75/30 206/524.1 |
| 2015/0037079 A1 | 2/2015 | Sone | |

OTHER PUBLICATIONS

CN-103752563-A—English Machine Translation (Year: 2014).*
CN-103736577-A—English Machine Translation (Year: 2014).*
CN103736577A—Human translation to English (Year: 2014).*

* cited by examiner

AUTOFEEDER ROLLER CLEANING

CROSS-REFERENCE TO PRIOR APPLICATIONS

The present application claims the benefit and priority of U.S. Provisional Patent Application Ser. No. 62/459,540, filed 15 Feb. 2017 and U.S. Provisional Patent Application Ser. No. 62/608,509, filed 20 Dec. 2017.

U.S. GOVERNMENT SUPPORT

Not Applicable

BACKGROUND OF THE INVENTION

Area of the Art

The present invention is in the art of paper shredders and is more specifically directed to a product for cleaning the feed rollers of an autofeed paper shredder, Description of the Background Paper shredders are ubiquitous even though the modern office is supposed to be "paper-free." No matter how hard one attempts to go paper free, it is still sometimes necessary to print copies of documents. After the document's usefulness is over, the document must be destroyed if it contains any confidential information. Paper shredders are a very efficient way of destroying documents. It is theoretically possible to reconstruct a shredded document from the tiny pieces of "confetti" output by a modern shredder, but the amount of effort virtually guarantees that no such reconstruction will ever occur. The main complaint many users have is not a lack of security posed by shredded documents, but rather the incredible amount of time that can be wasted by feeding documents one by one into the paper shredder.

This problem has been alleviated by the advent of autofeeding paper shredders. These units use a mechanism to remove sheets of paper from a stack and feed then into the input of a paper shredder. This allows the user to insert a large stack of documents into a paper shredder and then let the machine "feed" itself rather than wasting time feeding sheets one at a time into the shredder. A popular scheme employs a pair of counter-rotating rollers or belts at the bottom of a paper compartment. The rollers grasp the bottom sheet and pull it into a shredding mechanism located below the rollers. The counter-rotating rollers cause the sheet to fold and the folded sheet enters the mechanism. Alas, no automated system is without attendant problems. With repeated use the feed rollers become coated with paper lint and other detritus. Eventually, the rollers are no longer able to grip the bottom sheet of paper and the auto-feeder either works intermittently or fails entirely. This requires an attempt to clean the rollers. Although it is possible to clean the feed rollers by applying an appropriate solvent to a rag or paper towel and then use the moistened cleaning sheet to rub the feed rollers, this is only partially effective because only the top surface of the rollers can be reached without disassembling the shredder. Safety interlocks prevent operation of the shredder with the door to the paper compartment open. Therefore, it is necessary to close the door with a few sheets of paper in place; allow the unit to shred the sheets; and then reopen the door hoping that the rollers have stopped in a different position so that more of their surface can be cleaned.

SUMMARY OF THE INVENTION

Autofeed paper shredders are a great convenience because they allow the shredding of a stack of papers without operator intervention. Generally, papers are stacked in a paper compartment and rollers or their equivalent (e.g., flexible belts) withdraw one or more sheets of paper from with the top or the bottom of the paper stack and transport those sheets to the shredding mechanism. Unfortunately, the autofeed rollers eventually become fouled with dirt and dust and are no longer able to grip sheets of paper and pull them from the stack. The present invention provides a simple and effective treatment to clean the autofeed rollers so that they are once more able to remove sheets of paper from the stack.

The inventive cleaning sheets contact the rollers or their equivalent with cleaning material that is either moistened with a solvent or treated with a low tack adhesive—either of which remove dirt and contaminants from the roller. In one embodiment the moistened cleaning material (generally moistened by being sprayed with a cleaning solution) or the low tack cleaning material are attached by fasteners to a rigid sheet sized to fit into the paper compartment. The lower or upper face (depending on configuration of the autofeed system) of the rigid sheet bears the cleaning material, which cleaning material is brought into contact with the feed rollers when the sheet is inserted into the shredder. The shredder is operated which causes dirt to be transferred from the rollers to the cleaning material. The rigid sheet cannot be pulled into the shredding mechanism. After use, the used cleaning material is removed from the rigid sheet and discarded. Later, fresh cleaning material can be attached to the rigid sheet so that the cleaning process can be repeated.

Alternatively, the cleaning material can be attached to a flexible but impermeable sheet. Premoistened cleaning material can be attached to the flexible sheet and protected by a peel-off cover which is removed prior to use. If the cleaning material is not premoistened, a spray bottle of cleaning solution is provided so the cleaning material can be moistened prior to use. Or the premoistened cleaning material can be protected by folding the flexible sheet and sealing it along three edges. In that case, the sheet is peeled open along the sealed edges and placed into the autofeed with the cleaning side positioned to contact the feed roller. The shredder is operated and after the rollers are cleaned, they may grab the entire flexible sheet and shred it, thereby additionally cleaning the shredding mechanism. If the rollers fail to grab the sheet, it can be manually fed into the shredder to clean the mechanism.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a system and device for cleaning feed rollers in autofeed paper shredders.

Figure 1:
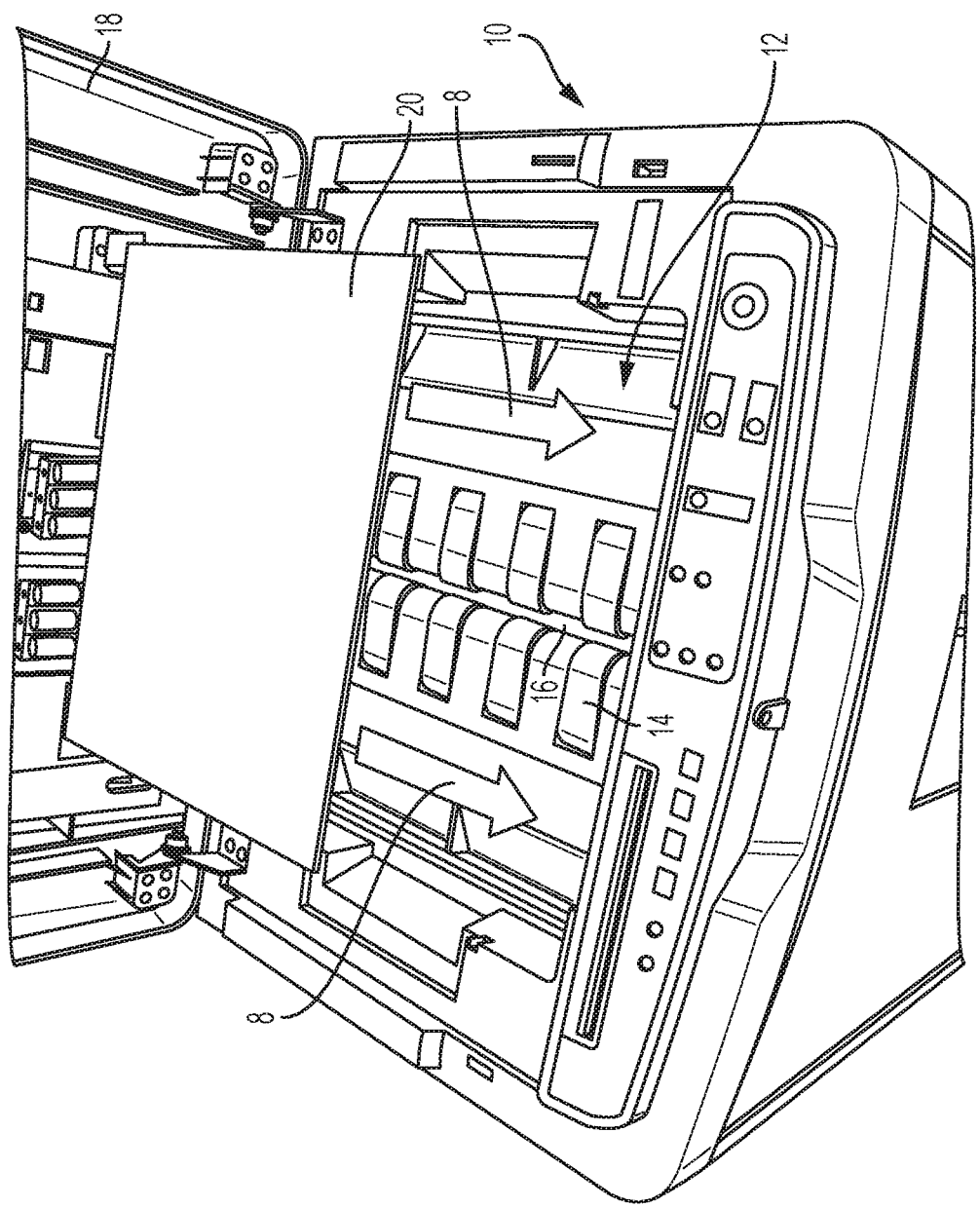
FIG. 1 is a drawing of an input compartment of a paper shredder indicating how the inventive cleaning sheet is placed into the shredder.

The present invention is directed to a system for cleaning the feed rollers in a simpler and more reliable fashion. As shall be detailed below, the cleaning system consists of a "cleaning sheet" 20 sized to be placed into the input compartment of an autofeed paper shredder. the cleaning "sheet" exists in two different configurations—one which is rigid and cannot be drawn into the shredding mechanism and one which is flexible and can be drawn into the shredding mechanism. Both configuration is intended for use in a "bottom-feeding" autofeed paper 10 as is shown in FIG. 1. This type of shredder has a paper compartment 12 in the upper surface of the device into which a user places a stack of documents to be destroyed. The compartment 12 is closed by a lid 18. The compartment 12 has an input slot 16 beneath which is located the shredding mechanism. Belts or rollers 14 are located on either side of the input slot 16. In operation the belts 14 move towards the input slot 16 grabbing a sheet of paper from the bottom of the stack and pulling it into the input slot 16. However, this invention can also be used in other autofeeding paper shredders that use rollers or belts to remove sheets of paper from a stack. The cleaning sheet 20 is placed into the compartment 12 with the arrows 8 indicating that the cleaning sheet 20 is to be placed in the compartment 12 and in contact with the rollers/belts 14.

Figure 2:
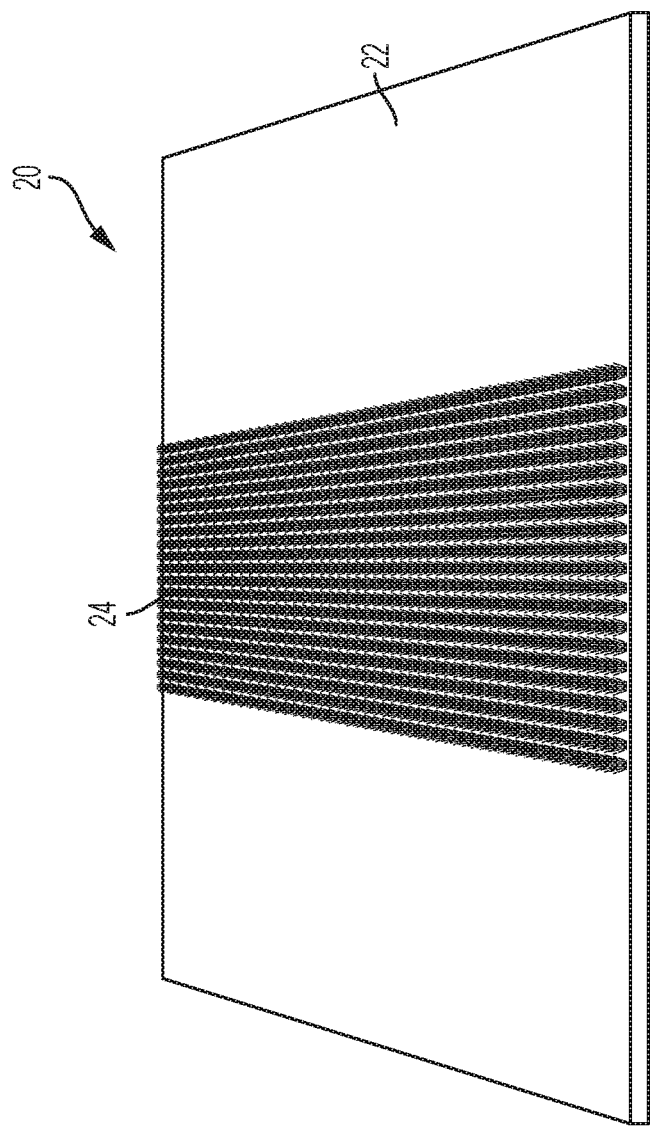
FIG. 2 is a drawing of a first embodiment of the invention which includes a rigid non-shreddable portion.

FIG. 2 shows a reusable device 22 intended to easily clean the belts or rollers 14. A "board" 22 approximately the same size as a sheet of paper (the auto-feeder is designed to auto-feed and shred common 8.5 inch×11 inch paper, although adjustments may be provided to allow shredding of other paper sizes). The board 22 can be constructed from any reasonably rigid material such as cardboard, foam-core or plastic. As shown in the drawing, a sheet of cleaning material 24 is fastened to an area in the middle of the board 22. The cleaning material is attached by fasteners such as slots or clips. The cleaning material 22 is sized to cover the feed rollers and can be a woven or non-woven fabric, a sponge-like material or a fabric or material equipped with fine bristles. Depending on the material it is held in place by slots, hinged flaps or other appropriate fastening systems (not shown). The cleaning material 22 is moistened with a special spray-on cleaner (such as an aqueous solution of propylene glycol methyl ether or another "glyme" type ether, other appropriate solvent or an aqueous detergent solution). It is important that the cleaner help loosen lint and dirt while being non-toxic and non-flammable. The precise formula is selected with the structural component of the shredder in mind so that no damage occurs.

To clean the shredder 10, one merely inserts the cleaning board 22 with the cleaning material side down into the paper compartment 12; the paper compartment lid 18 is then closed and the shredder is operated. The belts or rollers 14 are unable to grip and fold the board, but they do rotate in contact with the moistened cleaning material so that the feed rollers 14 are well cleaned. After the rollers 14 are cleaned, they are allowed to dry for a minute or two before the shredder is placed back into operation. The used cleaning material 24 is then thrown away, and the board 22 is put away for later use.

Figure 3:
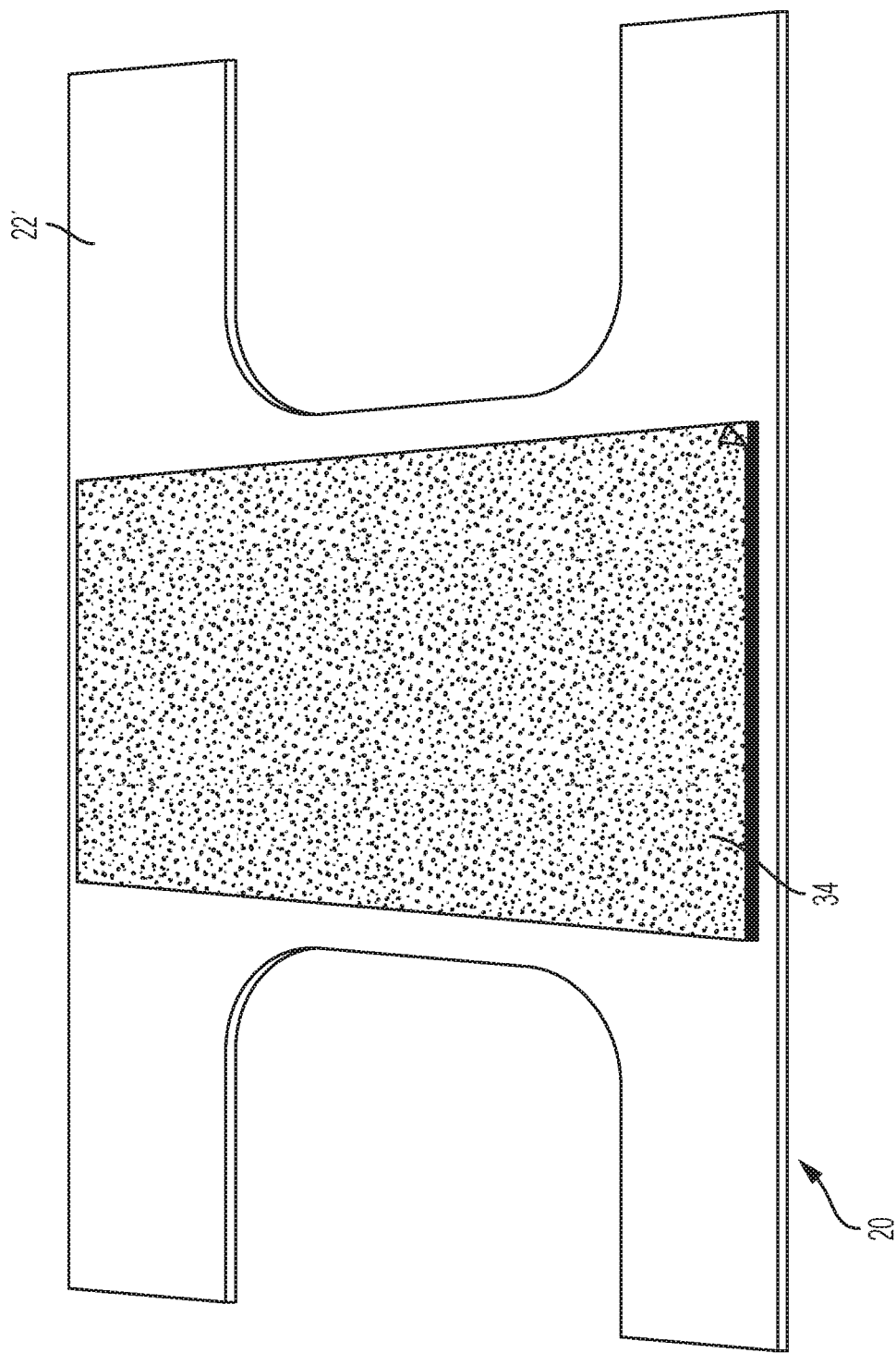
FIG. 3 is a drawing of a second embodiment of the invention which includes a rigid non-shreddable portion.

FIG. 3 shows an alternate embodiment which replaces the moistened cleaning material 24 with a dry sheet 34 of material that has been coated with a low tack dry adhesive. Such an adhesive has relatively low adhesive properties not unlike those of the common lint roller used to clean clothing. In some cases, optimum results are obtained by first cleaning with a low tack adhesive sheet 34 and then clean with the moistened cleaning material. The low-tack adhesive removes the majority of lint and "paper dust" while the moistened cleaning material dissolves oil, glaze and ink that have accumulated on the feed rollers. Note that the rigid sheet 22' may have cut-out shapes to facilitate gripping the sheet 22'. Other cut-out shapes are applicable to this embodiment as well as that of FIG. 2; similarly, the rectangular sheet 22 of FIG. 2 can be used with the low tack sheet 34. The low tack adhesive sheets 34 are advantageously arranged as a pad or tablet so that a used sheet can be peeled off to reveal a new sheet.

Figure 4:
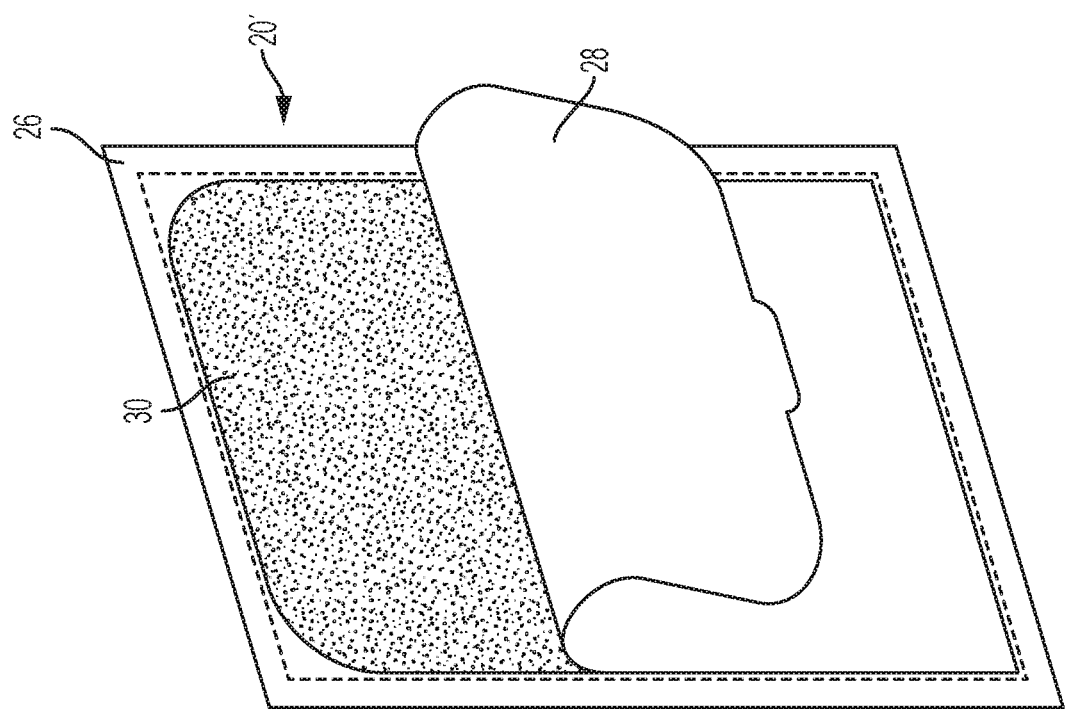
FIG. 4 is a drawing of a third embodiment of the invention which includes a flexible shreddable portion.

FIG. 4 shows an alternate embodiment 20' of the present invention. In this embodiment, pre-moistened cleaning material 30 is laminated or otherwise attached to one surface of a flexible, impermeable material 26. The surface of the cleaning material is protected by a peel off cover 28 that keeps the material moist. To use the sheet 20', one merely peels off the cover 28 and places the sheet cleaning face down on the feed rollers 14. The paper compartment lid 18 is closed and the shredder operated. Because of the cleaning solution, the rollers slip in contact with the cleaning material and transfer their load of dirt and dust to the cleaning material 30. The rollers may regain sufficient gripping power to pull the entire sheet 26 into the shredder (where it picks up additional dust before being shredded). If the shredder is unable to shred the sheet 26, the used sheet can be removed and disposed of (possibly by being fed into the shredders single sheet input). As with the board embodiment 20 (FIG. 2) the cleaning sheets 20' (with or without a cover 28) can be sold in a resealable envelope to prevent evaporation or as dry sheets with a spray bottle of cleaning solution allowing the user to spray on the cleaning solution just before using a fresh cleaning sheet 20'. Also, the product can be provided with a low-tack adhesive cleaning surface for lint and dust removal prior to moist cleaning effected by spraying on cleaning solution. The primary difference between the embodiments of FIGS. 4 and 5 and those of FIGS. 2 and 3 is that in the latter two embodiments, the cleaning material is attached to the surface of a rigid board 22 that is not shredded but is reused with fresh sheets of cleaning material.

Figure 5:
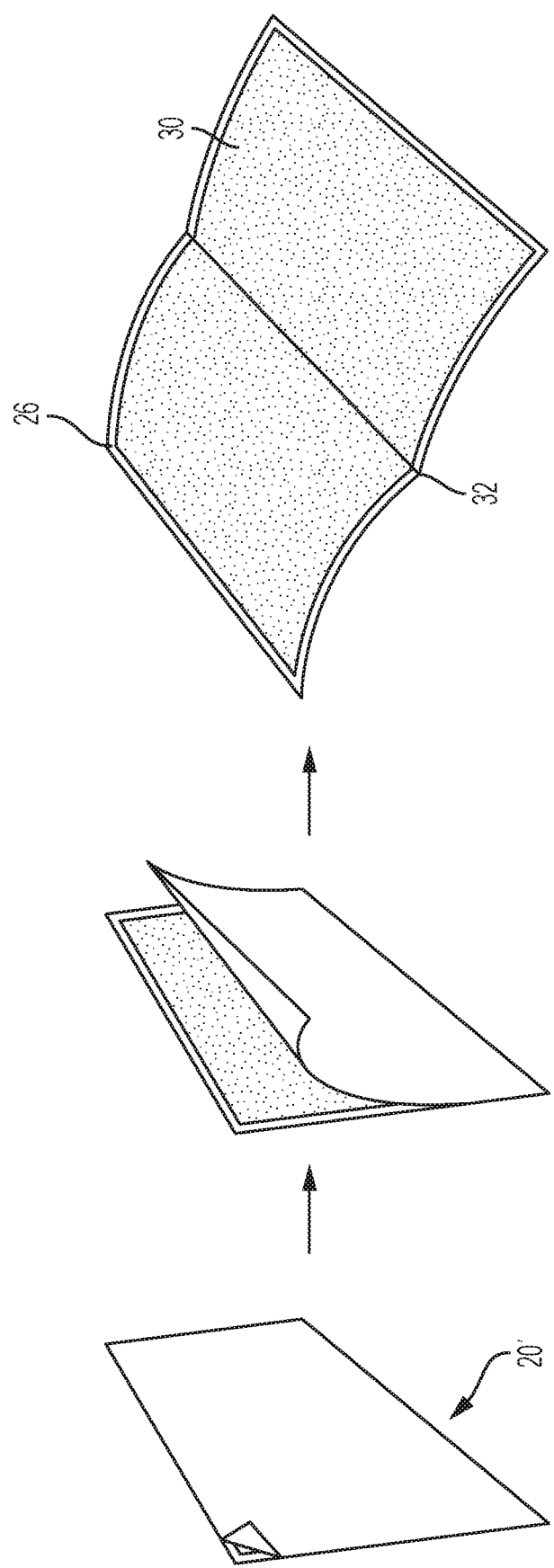
FIG. 5 is a drawing of a fourth embodiment of the invention which includes a flexible shreddable portion.

FIG. 5 shows a variation of the embodiment of FIG. 4. Essentially, the cleaning sheet 30 is bonded to the flexible, impermeable cover 22 of a protective packet 20'. The bonded combination is treated with cleaning solution (as above) and folded and closed with a "peelable" adhesive so that the three non-fold edges can be peeled apart to reveal the cleaning surface 30 which is then placed face-down on the rollers to clean them. The rollers 14 usually draw the packet 20' into the shredding mechanism so that not only are the rollers 14 cleaned in the process, the packet is shredded and cleans the shredding mechanism.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A cleaning sheet for autofeed rollers of a paper shredder comprising:
   a flexible sheet of material configured to pass into a shredding mechanism of the paper shredder; and
   a layer of pre-moistened cleaning material bonded to only one side of the flexible sheet, wherein the layer of cleaning material includes a cleaning solution,
   whereby placing the cleaning sheet with the layer of cleaning material in contact with the autofeed rollers and operating the paper shredder cleans the rollers to restore autofeed roller paper grip.

2. The cleaning sheet according to claim 1, wherein the layer of cleaning material is protected by a peel off cover.

3. The cleaning sheet according to claim 1, wherein the cleaning sheet is formed into a packet by folding the sheet and sealing the edges.

4. The cleaning sheet according to claim 1, wherein the flexible sheet is configured to be foldable in half.

5. The cleaning sheet according to claim 1, wherein the layer of cleaning material is configured to be foldable in half.

6. The cleaning sheet according to claim 1, wherein the layer of cleaning material is configured such that there is space between edges of the layer of cleaning material and respective edges of the flexible sheet.

7. The cleaning sheet according to claim 1, wherein the flexible sheet of material comprises an impermeable material.

* * * * *